(12) United States Patent
Fuchs

(10) Patent No.: US 11,953,469 B2
(45) Date of Patent: Apr. 9, 2024

(54) FLUID ANALYSIS UTILIZING ACOUSTIC WAVEGUIDES APPLIED ANGULARLY TO FLUID FLOW

(71) Applicants: Buerkert Werke GmbH & Co. KG, Ingelfingen (DE); Burkert S.A.S., Triembach-au-Val (FR)

(72) Inventor: Yannick Fuchs, Ingelfingen (DE)

(73) Assignees: BUERKERT WERKE GMBH & CO. KG (DE); BURKERT S.A.S. (FR)

( * ) Notice: Subject to any disclaimer, the term of this patent is extended or adjusted under 35 U.S.C. 154(b) by 211 days.

(21) Appl. No.: 17/552,462

(22) Filed: Dec. 16, 2021

(65) Prior Publication Data

US 2022/0187251 A1   Jun. 16, 2022

(30) Foreign Application Priority Data

Dec. 16, 2020 (FR) ..................... 20/13316

(51) Int. Cl.
*G01N 29/22* (2006.01)
*G01F 1/60* (2006.01)
(Continued)

(52) U.S. Cl.
CPC .......... *G01N 29/221* (2013.01); *G01N 29/02* (2013.01); *G01N 29/34* (2013.01); *G01N 29/36* (2013.01);
(Continued)

(58) Field of Classification Search
CPC ....... G01N 2291/105; G01N 2291/102; G01N 2291/0423; G01N 2291/02818;
(Continued)

(56) References Cited

U.S. PATENT DOCUMENTS 3,477,278 A * 11/1969 Lynnworth ............ G01N 29/09
73/64.53
3,500,950 A * 3/1970 Roever ................... G01V 1/52
367/138
(Continued)

FOREIGN PATENT DOCUMENTS

CN       204575596 U  *  8/2015
DE    102019110514 A1    10/2019
(Continued)

*Primary Examiner* — Peter J Macchiarolo
*Assistant Examiner* — Monica S Young
(74) *Attorney, Agent, or Firm* — Dilworth IP, LLC

(57) ABSTRACT

A fluid measuring device for determining at least one characteristic property of a fluid includes a measuring tube having a fluid duct and a measuring section in which the measuring tube is cylindrical on the inside and an area of a measuring tube wall is configured as a waveguide, and a transmitter for exciting acoustic waves in the waveguide and a receiver for receiving acoustic waves which are in direct contact with an outer surface of the waveguide, wherein acoustic waves excited by the transmitter are adapted to propagate as a volume wave through the fluid. The waveguide has an elongated waveguide path which extends at an acute angle to a longitudinal extension direction of the measuring tube and with a component in the circumferential direction, wherein in the area of the waveguide path, the measuring tube wall has a smaller wall thickness than in areas adjoining the waveguide path.

15 Claims, 6 Drawing Sheets

(51) Int. Cl.
  *G01F 1/66* (2022.01)
  *G01F 1/667* (2022.01)
  *G01N 29/02* (2006.01)
  *G01N 29/24* (2006.01)
  *G01N 29/34* (2006.01)
  *G01N 29/36* (2006.01)

(52) U.S. Cl.
  CPC ............... *G01F 1/60* (2013.01); *G01F 1/662* (2013.01); *G01F 1/668* (2013.01); *G01N 29/022* (2013.01); *G01N 29/22* (2013.01); *G01N 29/222* (2013.01); *G01N 29/2462* (2013.01); *G01N 2291/02818* (2013.01); *G01N 2291/102* (2013.01); *G01N 2291/105* (2013.01)

(58) Field of Classification Search
  CPC .. G01N 2291/022; G01N 29/36; G01N 29/34; G01N 29/2462; G01N 29/02; G01N 29/222; G01N 29/022; G01N 29/221; G01F 1/668; G01F 1/662
  USPC .......................................................... 73/64.53
  See application file for complete search history.

(56) References Cited

U.S. PATENT DOCUMENTS

| | | | |
|---|---|---|---|
| 4,336,719 A * | 6/1982 | Lynnworth | G01F 1/002 73/861.31 |
| 6,513,365 B1 * | 2/2003 | Bruetting | G01N 29/2425 73/61.49 |
| 10,845,338 B2 | 11/2020 | Fuchs et al. | |
| 2014/0278193 A1 * | 9/2014 | Breon | G01N 29/043 702/113 |
| 2019/0011299 A1 | 1/2019 | Faustmann et al. | |
| 2019/0154531 A1 * | 5/2019 | Ploss | G01F 1/66 |
| 2019/0331642 A1 | 10/2019 | Fuchs et al. | |

FOREIGN PATENT DOCUMENTS

| | | | | |
|---|---|---|---|---|
| WO | WO-2011039311 A2 * | 4/2011 | ............ | G01F 1/662 |
| WO | WO-2017125614 A1 * | 7/2017 | ............ | G01F 1/662 |

* cited by examiner

FLUID ANALYSIS UTILIZING ACOUSTIC WAVEGUIDES APPLIED ANGULARLY TO FLUID FLOW

FIELD OF THE INVENTION

The invention relates to a fluid measuring device for determining at least one characteristic property of a fluid.

BACKGROUND

The invention in particular relates to a fluid measuring device for determining one or more characteristic properties of a liquid flowing therethrough. The properties of the fluid include, for example, the concentration, the density, the viscosity, the sound velocity, the flow velocity, the flow rate, the temperature and/or the homogeneity thereof.

Document DE 10 2019 110 514 A1 discloses a generic fluid measuring device which serves to measure certain properties of the fluid flowing in the fluid duct using acoustic waves. To this end, surface acoustic waves (SAW) are excited in the waveguide formed by part of the wall of the fluid duct, the type and frequency of which are selected such that a partial decoupling into the fluid which is in direct contact with the waveguide occurs. Part of the surface acoustic waves in the waveguide is thus coupled into the fluid as longitudinal volume sound waves and passes therethrough.

On their way through the fluid, the sound waves are reflected at least once at an opposite wall of the fluid duct so that they hit the waveguide again, where part of these volume waves is again coupled into the wave guide as surface acoustic waves and continues to travel therein. A characteristic signal the temporal intensity course of which (including the time delay with respect to the signal emitted by the transmitter) allows conclusions to be drawn about characteristic properties of the fluid is thus produced at a receiver which is arranged on the waveguide at a distance from a transmitter.

In this fluid measuring device known from the prior art, the transmitter and the receiver are arranged on the outside of the measuring tube so as to lie on a straight line running parallel to the longitudinal axis of the measuring tube. In this way, primarily the fluid flowing through the center of the measuring tube is measured. In particular at the transition from turbulent to laminar flows and vice versa, or in case of an asymmetric flow profile, the measurement at the center can however lead to significant measurement errors. As turbulent or instable flow profiles often occur directly behind branches or similar, a large inflow path has to be selected for the most accurate measurement possible, such that the flow in the area of the measurement is again mainly present as a stabilized flow profile.

It is thus the object of the invention to provide a fluid measuring device in which the mentioned difficulties are avoided.

SUMMARY

To this end, the invention provides a fluid measuring device for determining at least one characteristic property of a fluid, comprising a measuring tube having a fluid duct through which the fluid can flow and which has a measuring section in which the measuring tube is cylindrical on the inside and at least an area of a measuring tube wall is configured as a waveguide for surface acoustic waves which forms an interface to the fluid, and at least one transmitter for exciting acoustic waves in the waveguide and at least one receiver for receiving acoustic waves from the wave guide which are arranged in direct contact with an outer surface of the waveguide, wherein acoustic waves excited by the transmitter are adapted to propagate at least in sections as a volume wave through the fluid. The waveguide has at least one elongated waveguide path, which with respect to the center line thereof, extends at least in sections at an acute angle to the longitudinal extension direction of the measuring tube and in addition with a component in the circumferential direction, wherein in the area of the waveguide path, the measuring tube wall has a smaller wall thickness than in areas of the measuring tube adjoining the waveguide path.

The measuring tube itself can be configured to be cylindrical at least in the measuring area.

Therefore, in the fluid measuring device according to the invention, the waveguide path extends at least partially obliquely about the measuring tube, wherein the angle does not necessarily have to be constant over the length of the path. Such a fluid measuring device also allows a high measurement accuracy to be obtained even for a small inflow path. The surface waves are guided through the waveguide path due to the smaller wall thickness which is in particular adapted such that the surface waves propagate particularly well along the waveguide path and can couple equally well into the fluid.

The waveguide path e.g. extends substantially along a helical line about the fluid duct and/or has an S-shape. In such a configuration of the waveguide path from which the surface waves couple into the fluid in the measuring tube at any point, a substantially helical or S-shaped curved, helix waveform which runs around the center of the measuring tube but avoids it as far as possible is also obtained for the volume waves in the measuring tube. This leads to a higher measurement accuracy, as (apart from the center) more portions of the flowing fluid are detected and measured due to the substantially helical waveform.

In a configuration, the smaller wall thickness ($d_1$) in the area of the waveguide path is produced by a groove in the exterior side of the measuring tube. A reduction of the wall thickness can thus be achieved particularly easily.

The groove is e.g. produced by machining, in particular by milling, as a result of which a simple and cost-effective manufacture of the fluid measuring device is achieved.

The groove can have a substantially U-shaped cross-section. A frame composed of substantially perpendicular walls is thus obtained, which delimits the waveguide path and is used for the directed guidance of the surface waves and as a damping element for the surface waves in the border region of the waveguide path.

In a further development, the groove, in a top view onto the groove, has rounded longitudinal ends. Alternatively, the ends may also be configured to be cornered or pointed. In any case, surface waves arriving at the ends are dampened or reflected away.

To achieve a particular good transmission of the surface waves into the fluid, the measuring tube wall preferably has a substantially constant wall thickness along the waveguide path.

In an embodiment of the invention, two waveguide paths are provided. In particular, they both extend at least partially obliquely about the measuring tube. More than two waveguide paths are of course also conceivable. A combination comprising paths which extend parallel to the longitudinal axis of the measuring tube along the latter or in the circumferential direction is also possible.

An advantageous configuration is achieved if the two waveguide paths are arranged offset along the circumference of the measuring tube and in particular have the same shape and preferably lie at the same axial height of the measuring tube. The volume waves propagate in the fluid between the two waveguide paths.

The two waveguide paths circumferentially can have the same distance to each other over their length. Thus, both waveguide paths have the same winding, as a result of which a substantially helical shaped propagation of the volume waves in the fluid is achieved.

In an embodiment, the two waveguide paths are arranged offset by less than 180° along the circumference, preferably by approximately 120°. This results in the omission of a central area of the fluid duct for the volume waves, the diameter of the omitted area corresponding approximately to half the diameter of the cylindrical fluid duct.

Therefore, no measurement takes place in the center of the fluid duct, as simulations and measurements have shown that at the transition from a laminar to a turbulent flow, measurement errors occur in particular in the center of the fluid duct. In fluid measurement devices according to the prior art, these measurement errors were compensated for with a large inflow path which is not necessary in the configuration according to the invention due to the higher measurement accuracy. Therefore, the fluid measuring device according to the invention may be arranged directly behind T-tube sections or angled, bent or curved tubes.

One transmitter and one receiver may be assigned to each of the two waveguide paths. With this total of four transducer units, a particularly accurate measurement of the properties of the fluid flowing through the fluid duct is achieved.

As seen in the longitudinal extension direction of the measuring tube, each waveguide path preferably has a first end and a second end, wherein a transmitter is provided at at least one first end and a receiver is provided at at least one second end. In the case of two paths and two transmitter-receiver pairs, in particular both transmitters are arranged at the first ends and both receivers are arranged at the second ends. If only one transmitter-receiver pair is present, the transmitter is arranged at the first end of a waveguide path, while the receiver may be provided at the second end of the same waveguide path or of the other waveguide path.

In a further development of the invention, at least the ends of the at least one waveguide path at which a transmitter or a receiver is arranged, are flattened and form a planar contact surface for the transmitter or receiver. The remaining waveguide path—like the outer surface of the cylindrical measuring tube—may be bulged. The transducer units are preferably bonded onto the contact surfaces.

DETAILED DESCRIPTION

Figure 1:
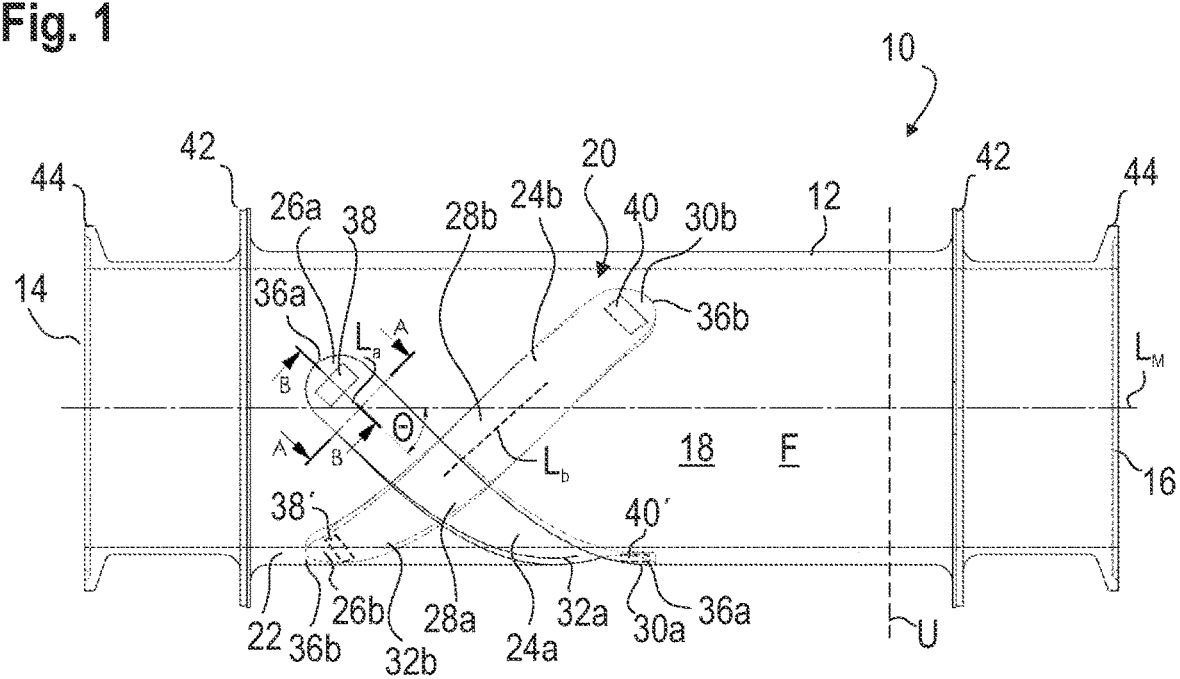
FIG. 1 shows a partially transparent sectional view of a first embodiment of a fluid measuring device according to the invention in two variants.

FIG. 1 shows a fluid measuring device 10 according to the invention. The latter includes a measuring tube 12 having a fluid inlet 14, a fluid outlet 16 and a fluid duct 18 which extends therebetween and through which a fluid F can flow. A center section of the measuring tube 12 serves as a measuring section 20 in which an area of a measuring tube wall 22 is configured as a waveguide for surface acoustic waves which forms an interface to the fluid F. The measuring tube 12 has a cylindrical, in particular circular cylindrical cross-section in the measuring section 20. Furthermore, the inner side of the measuring tube 12 is configured to be cylindrical.

The waveguide comprises two elongated waveguide paths 24a, 24b which, with respect to their respective center line $L_a$ or $L_b$, respectively, (running in the longitudinal direction of the path), extend at least in sections at an acute angle $\theta$ to the longitudinal extension direction $L_M$ of the measuring tube 12 and furthermore with a component in the circumferential direction U. The waveguide paths 24a, 24b also extend obliquely along the measuring tube wall 22. The longitudinal extension direction $L_M$ of the measuring tube 12 is to be understood as a straight line running parallel to the center axis of the measuring tube 12 in the measuring tube wall 22.

The angle $\theta$ along the waveguide paths 24a, 24b may be constant, which results in an exact helical line for the course of the respective path, but it does not have to be.

For example, in the present configuration, the waveguide paths 24a, 24b slightly deviate from an exact helical line and are configured to be slightly S-shaped in that the respective waveguide path 24a or 24b extends from a first end 26a or 26b to the center 28a or 28b of the path so as to be slightly curved to the left or to the right. At the center 28a or 28b, the direction of the curvature up to a second end 30a or 30b of the respective waveguide path 24a or 24b changes. In a top view onto the measuring tube 12, the two waveguide paths 24a, 24b may have identical or opposite curvatures with respect to their center line $L_a$ or $L_b$.

In the configuration shown, both waveguide paths 24a, 24b are substantially right-handed, i.e. they each wind in the clockwise direction about the measuring tube 12. In the lateral view of FIGS. 1 and 4, the first waveguide path 24a extends obliquely from the top to the bottom along the exterior side of the measuring tube 12, while the second waveguide path 24b, in this lateral view, extends obliquely from the bottom to the top along the part of the measuring tube wall 2 arranged at the rear in the figure.

The two waveguide paths 24a, 24b are arranged offset along the circumference U of the measuring tube 12, lie at the same axial height of the measuring tube 12, and have the same shape. Furthermore, both waveguide paths 24a, 24b have the same winding, i.e. circumferentially the same distance to each other over their length.

Figure 2:
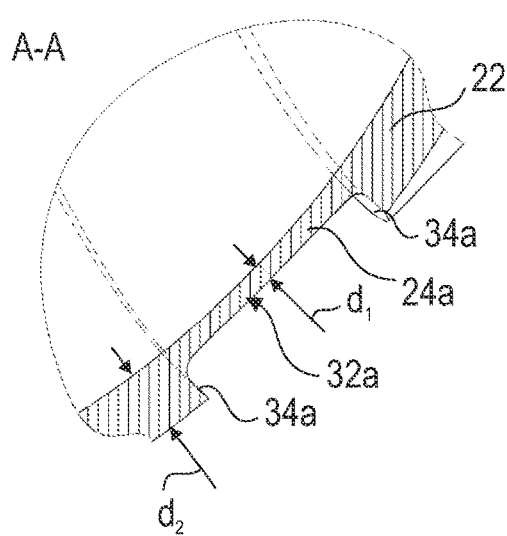
FIG. 2 shows a partial sectional view of the fluid measuring device of FIG. 1 along the line A-A in FIG. 1.
Figure 3:
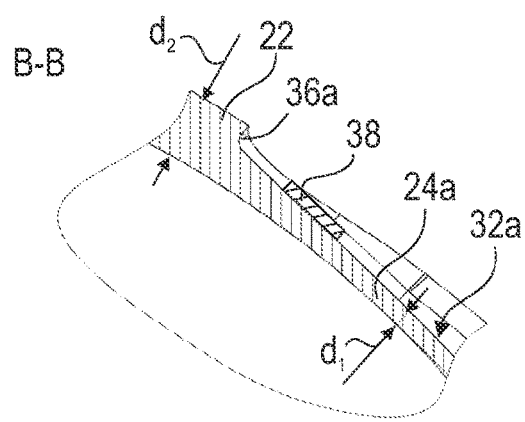
FIG. 3 shows a partial sectional view of the fluid measuring device of FIG. 1 along the line B-B in FIG. 1.

As can be seen in particular in the sectional views of FIGS. 2 and 3, the measuring tube wall 22 has a smaller wall thickness $d_1$ in the area of the waveguide paths 24a, 24b than in the areas of the measuring tube 12 adjoining the waveguide paths 24a, 24b, the wall thickness $d_1$ along the entire waveguide path 24a or 24b being constant and furthermore identical for both waveguide paths 24a, 24b. The larger wall thickness of the adjoining areas which also corresponds to the thickness of the remaining measuring tube 12 is denoted by $d_2$ in the figures.

The reduced wall thickness $d_1$ along the waveguide paths 24a, 24b is obtained in that a respective groove 32a or 32b is produced here in the exterior side of the measuring tube 12, more specifically in the measuring tube wall 22. The grooves 32a, 32b are manufactured by machining, for example by milling, and have a substantially U-shaped cross-section. In this way, a rim or a kind of frame 34a or 34b made of practically perpendicular walls is obtained, which delimits the respective waveguide path 24a or 24b (see in particular FIGS. 2 and 6).

Furthermore, the grooves 32a, 32b (as seen in a top view onto the respective groove 32a, 32b) have rounded longitudinal ends 36a or 36b. Alternatively, they may also be configured to be cornered or pointed.

A transmitter 38 for exciting acoustic waves in the waveguide, in particular in the first waveguide path 24a, is arranged at the first end 26a of the first waveguide path 24a. Furthermore, a receiver 40 is arranged at the second end 30b of the second waveguide path 24b, which serves to receive acoustic waves from the waveguide, in particular from the second waveguide path 24. Both the transmitter 38 and the receiver 40 are arranged in direct contact with an outer surface of the waveguide or the respective waveguide path 24a, 24b.

As indicated by dashed lines in FIG. 1, an additional transmitter-receiver pair 38', 40' may furthermore be provided in a second variant of the invention, the second transmitter 38' being then arranged at the first end 26b of the second waveguide path 24b and the second receiver 40' at the second end 30a of the first waveguide path 24a. In this configuration with a total of four transducer units which has proved to be particularly favorable in tests, a transmitter 38 or 38' and a receiver 40' or 40 are thus assigned to each waveguide path 24a, 24b.

The ends 26a, 26b and 30a, 30b of the waveguide paths 24a, 24b at which a transmitter 38, 38' or a receiver 40' is arranged are flattened and form a planar contact surface for the transmitter 38, 38' or receiver 40, 40'. The transducer units are preferably bonded onto the contact surface. The remaining waveguide path 24a, 24b and the measuring tube 12 are curved (see also in particular FIGS. 3 and 6).

A first pair of flanges 42 for attaching a sensor housing along with an evaluation electronics not shown in the figures, and a second pair of flanges 44 for integrating the fluid measuring device 10 into a pipe network are furthermore provided on the measuring tube 12 (see in particular FIG. 1).

Figure 4:
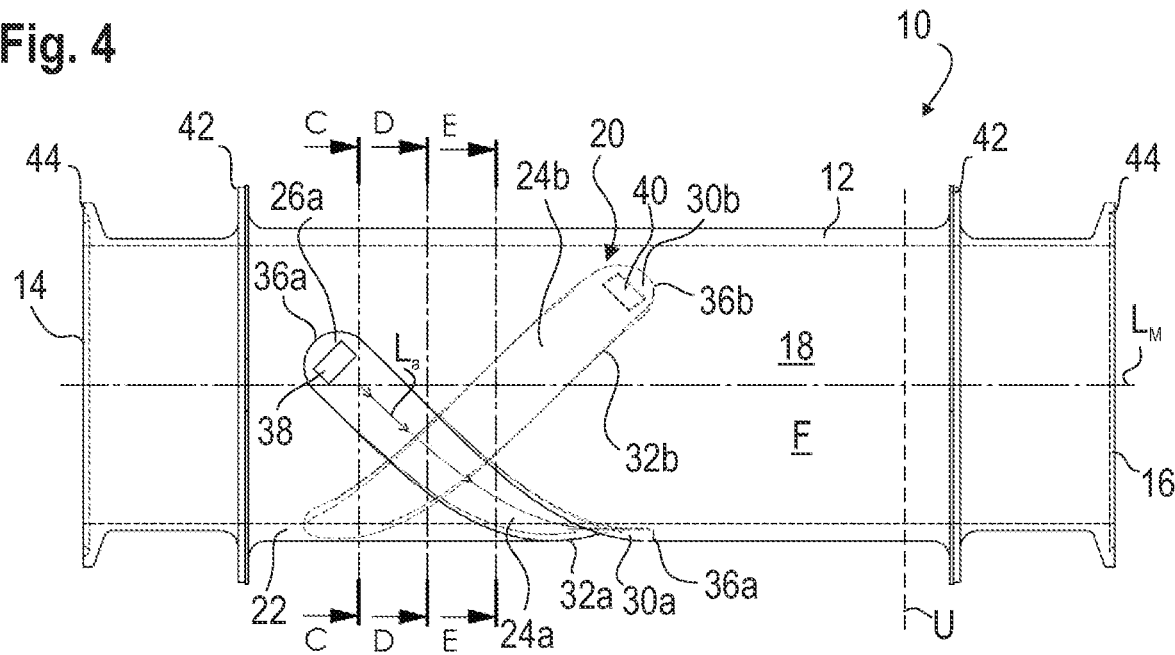
FIG. 4 shows a partially transparent lateral view of a variant of the fluid measuring device of FIG. 1.
Figure 5:
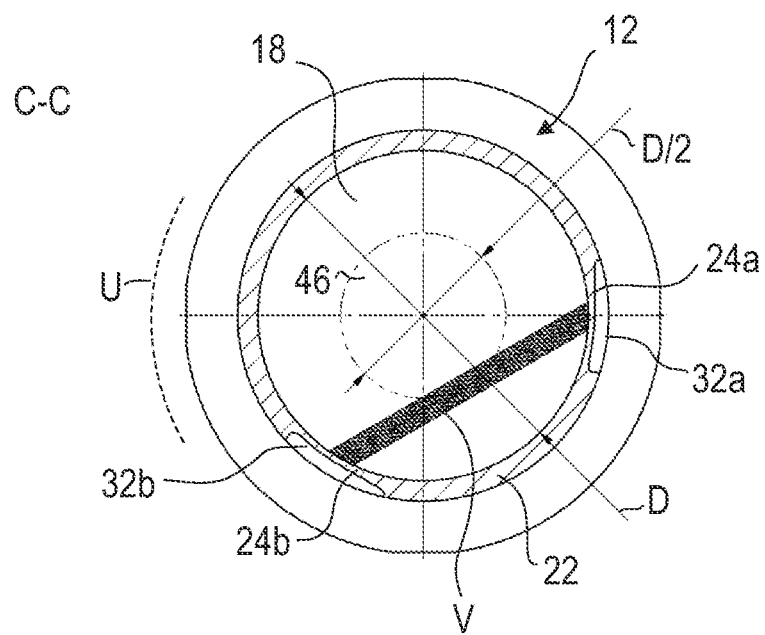
FIG. 5 shows a cross-section of the fluid measuring device of FIG. 4 along the line C-C in FIG. 4.
Figure 6:
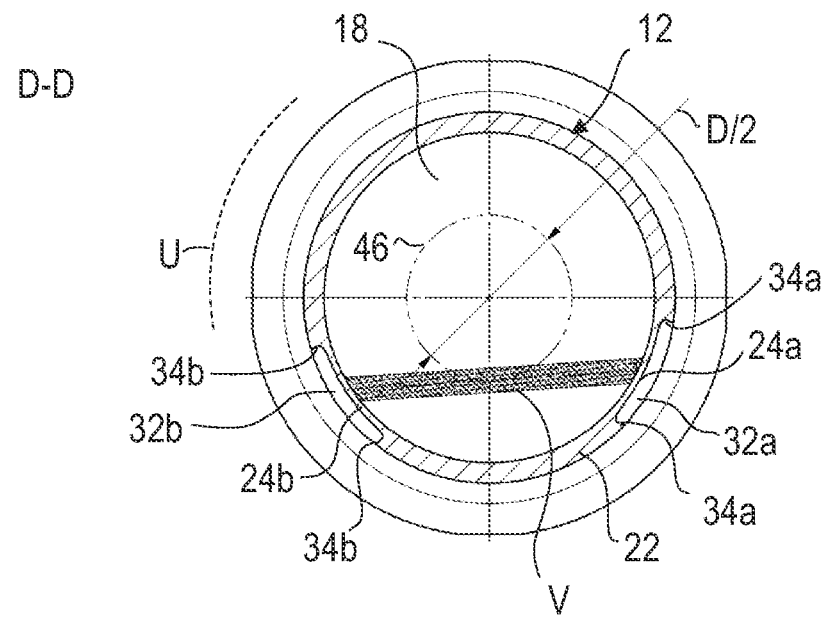
FIG. 6 shows a cross-section of the fluid measuring device of FIG. 4 along the line D-D in FIG. 4.
Figure 7:
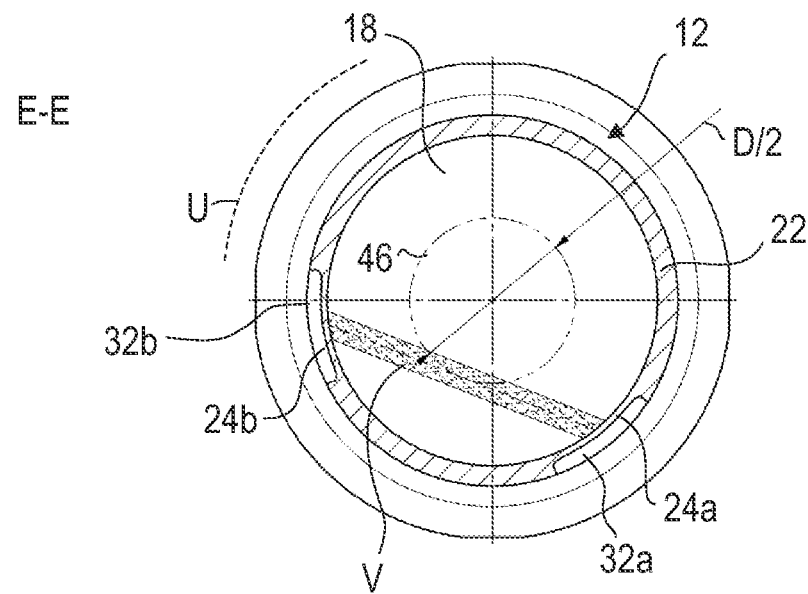
FIG. 7 shows a cross-section of the fluid measuring device of FIG. 4 along the line E-E in FIG. 4.
Figure 8:
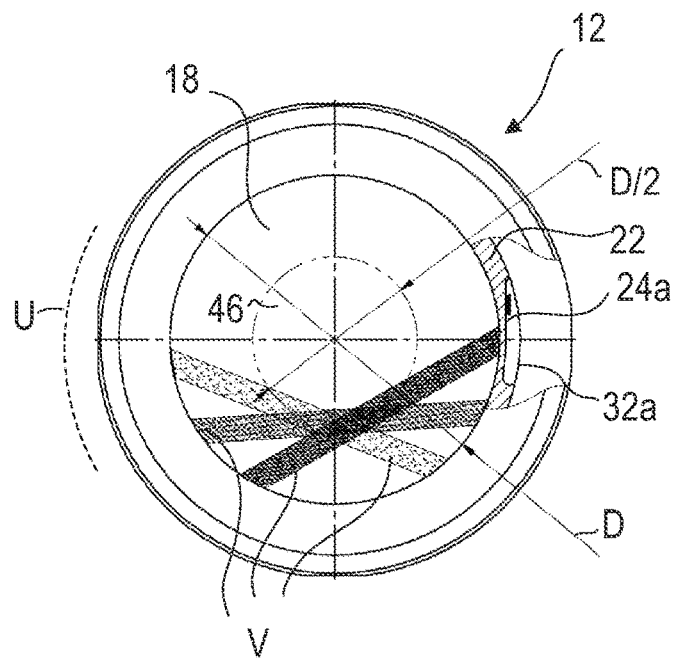
FIG. 8 shows a top view onto a front side of the fluid measuring device of FIG. 4.
Figure 9:
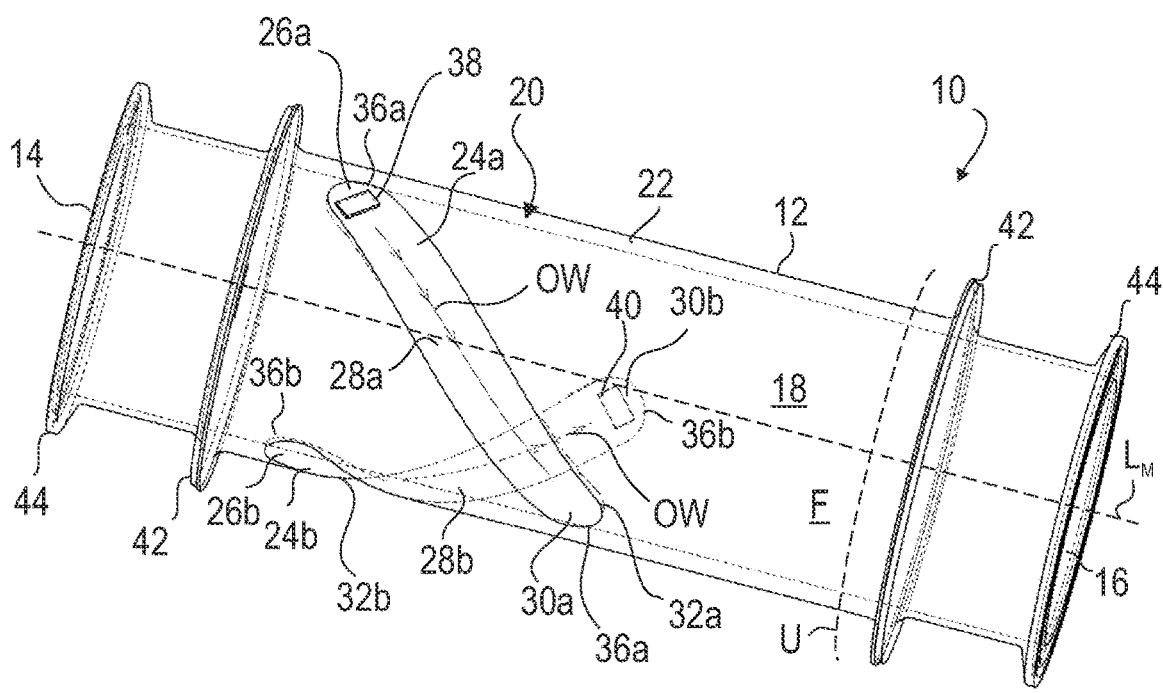
FIG. 9 shows a partially transparent perspective view of the fluid measuring device of FIG. 4.

As is primarily apparent from FIG. 4, the associated cross-sectional views of FIGS. 5 to 7, and from FIGS. 8 and 9, which all show the first variant of the fluid measuring device 10 with only one transmitter-receiver pair 38, 40, the two waveguide paths 24a, 24b are arranged offset by approximately 120° along the circumference U of the measuring tube 12.

To now measure certain properties of the fluid F within the fluid duct 18, the transmitter 38 excites surface acoustic waves OW in the area of the waveguide path 24a directly below the transmitter 38. These surface waves OW travel substantially in the longitudinal direction along the center line $L_a$ along the waveguide path 24a in the measuring tube wall 22. Due to the frame 34a which surrounds the waveguide path 24a, the signal is guided purposefully from the transmitter 38 to the second end 30a, while the surface waves OW in all other directions of propagation are dampened (see FIG. 9). The smaller wall thickness $D_1$ in the area of the waveguide path 24a thus permits a good coupling and propagation of the surface waves OW along the guided path in the measuring tube wall 22. However, in the areas having a larger wall thickness $d_2$, the surface waves OW are dampened and cannot or can only slightly propagate.

Due to the direct interface of the fluid F to the waveguide or to the waveguide path 24a, part of the energy of the surface acoustic waves OW is coupled into the fluid F at any point of the waveguide path 24a on the inner surface of the measuring tube 12 at the interface to the fluid F, and travels from there at a specific propagation angle α (with respect to a normal to the surface of the waveguide) as a volume wave V through the fluid F. At the opposite measuring tube wall 22, this volume wave V is coupled into the waveguide path 24b at each point thereof and continues to travel there as a surface wave OW to the receiver 40 which detects the corresponding signal.

The same applies to the signal of the second transmitter-receiver pair 38', 40', if present.

Due to the geometric design of the ends 36a, 36b of the grooves 32a, 32b, the surface waves OW arriving there are dampened and/or reflected away from the receiver 40 or 40'.

If the fluid F does not move in the measuring tube 12, the angle of incidence α of the volume wave V into the fluid F results from the ratio of the speed of sound $c_f$ in the fluid F to the speed of sound $c_w$ of the surface wave OW in the measuring tube wall 22 (or in the waveguide path 24a or 24b) to $$\alpha = \arcsin(c_f/c_w).$$

Thus, the angle α results from the "material pairing", wherein the speed of sound $c_w$ in the measuring tube wall 22 (or in the waveguide path 24a, 24b) has to be higher than the speed of sound $c_f$ in the fluid F so that a value different from zero is obtained, below which the surface wave OW couples into the fluid F and covers therein a spatial distance along the waveguide as a volume wave V. The surface waves include, among others, LAMB waves, Rayleigh waves or Leaky Rayleigh waves which are used therein.

Preferably, the smaller wall thickness $d_1$ of the measuring tube wall 22 in the area of the waveguide paths 24a, 24b is smaller than or equal to the wavelength of the surface acoustic waves OW and is in particular equal to approximately 50% of the wavelength of the surface acoustic waves. The surface waves can propagate particularly well at this optimum wall thickness.

In contrast thereto, the greater wall thickness $d_2$ of the surrounding wall areas is 20% to 95%, in particular 50% greater than the wall thickness $d_1$ of the waveguide paths 24a, 24b. This makes it possible to impede the coupling of surface waves into the wall areas surrounding the waveguide paths 24a, 24b.

As in the configuration shown, the waveguide paths 24a, 24b are arranged offset by approximately 120° along the circumference U of the measuring tube 12, an avoidance of a central area 46 of the fluid duct 18 is obtained for the volume waves V generated in the fluid F and indicated in FIGS. 5 to 8, so that no measurement of the fluid F takes place in this central area 46 of the fluid duct 18. The diameter of the central area 46 omitted by the measurement is approximately half the total diameter D of the fluid duct 18. In contrast thereto, the areas located around the central area 46 are fully detected. Measurements and simulations have shown that the best measurement results are obtained in this way.

A superimposition of FIGS. 5, 6 and 7 results in FIG. 8, in which the helical waveform (apart from the slight S-shaped curvature) of the volume wave V in the fluid F and the avoidance of the central area 46 can be seen.

Figure 10:
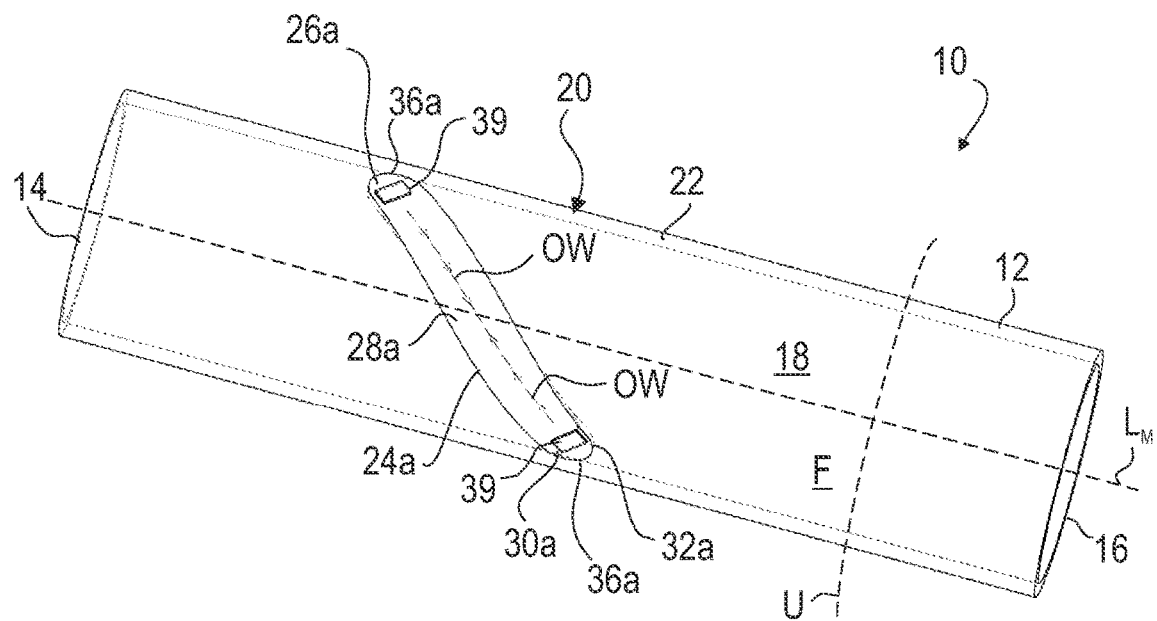
FIG. 10 shows a partially transparent perspective view of a second embodiment of a fluid measuring device according to the invention.

FIG. 10 shows a second embodiment of the fluid measuring device 10 according to the invention, identical components bearing the same reference signs, and only the differences to the embodiment described so far being discussed below.

The fluid measuring device 10 according to FIG. 10, of which only the measuring tube 12 is shown without any flanges, has only a single waveguide path 24a with two transducer units 39, which are arranged at the two ends 26a and 30a of the waveguide path 24a. In this configuration, the volume wave V coupled into the fluid F is reflected, for example, in an area of the measuring tube wall 22 opposite the waveguide path 24a. As indicated by the surface waves OW extending from both ends 26a, 30a toward the center 28a of the waveguide path 24a, both transducer units 39 can be operated alternately as a transmitter and a receiver. However, it is also possible to provide a (fixed) transmitter 38 and a (fixed) receiver 40.

Other variants than those shown in the figures are of course also possible. Though a configuration comprising two transmitter-receiver pairs 38, 40 or 38', 40' is preferred, it is also sufficient to provide one transmitter 38 and one receiver 40, the transmitter 38 being arranged at the first end of one waveguide path, and the receiver 40 being arranged at the second end of the other waveguide path. However, it is also possible to have two transducer units at the respective ends of one waveguide path and no transducer units on the other waveguide path.

Furthermore, an alternating operation of the transducer units as a transmitter and a receiver is also conceivable in the case of a plurality of waveguide paths 24a, 24b.

Of course, more than two waveguide paths could also be arranged on the measuring tube 12. A combination with waveguide paths which run along the measuring tube 12 or along the circumference U thereof is also possible.

Figure 11:
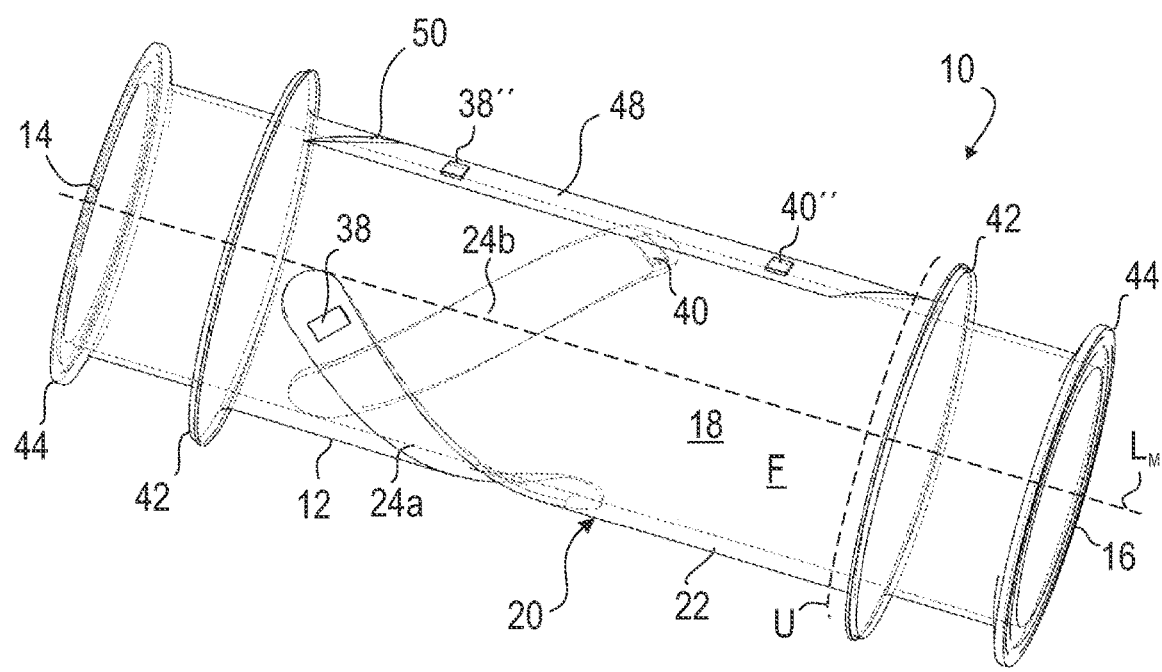
FIG. 11 shows a partially transparent perspective view of a third embodiment of a fluid measuring device according to the invention.
Figure 12:
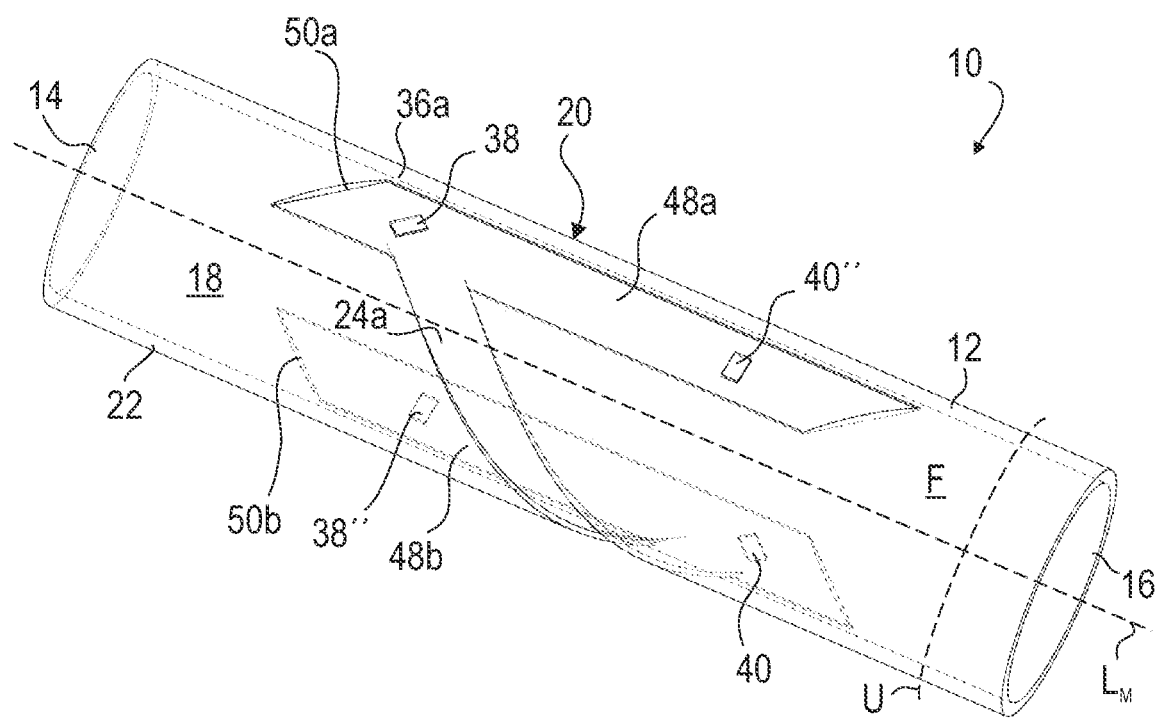
FIG. 12 shows a partially transparent perspective view of a fourth embodiment of a fluid measuring device according to the invention.

FIGS. 11 and 12 show two corresponding embodiments, identical components bearing again the same reference signs, and only the differences to the embodiments described so far being discussed.

The fluid measuring device 10 according to FIG. 11 has a similar design as the fluid measuring device 10 according to FIGS. 4 to 9, a further waveguide path 48 which extends along the measuring tube 12 (i.e. parallel to the longitudinal extension direction $L_M$) being provided in addition to the two waveguide paths 24a, 24b which extend obliquely to the longitudinal extension direction $L_M$ of the measuring tube 12.

In the area of the waveguide path 48, the measuring tube wall 22 also has a smaller wall thickness than in the areas of the measuring tube 12 adjoining the waveguide path 48. The smaller wall thickness in the area of the waveguide path 48 is again produced by a groove 50 in the exterior side of the measuring tube 12, which is in particular manufactured by milling.

A transmitter 38" and a receiver 40" are provided on the waveguide path 48, an alternating operation of the transducer units as a transmitter and a receiver being also conceivable here.

However, the fluid measuring device 10 according to FIG. 12 has only one waveguide path 24a which runs obliquely to the longitudinal extension direction $L_M$ of the measuring tube 12 and extends between two waveguide paths 48a, 48b which extend each along the measuring tube 12 and are arranged offset from each other by approximately 180° in the circumferential direction U.

The waveguide path 24a is directly connected to the waveguide paths 48a and 48b, so that waves generated by the transmitter 38 can propagate both along the waveguide path 24a to the receiver 40, and along the waveguide path 48a at the other end of which a second receiver 40" is arranged. In addition, the receiver 40 can also receive surface acoustic waves from a further transmitter 38" which is provided on the waveguide path 48b.

The waveguide paths 48a, 48b here also have smaller wall thicknesses which are also produced by grooves 50a, 50b milled into the exterior side of the measuring tube 12.

In the fluid measuring device 10 according to the invention, in principle a single transmitter-receiver pair is sufficient to realize a substantially helical waveform of the volume wave V in the fluid F. The surface waves OW are directed or guided by the waveguide path(s) and are transmitted particularly well into the fluid F due to the small, constant wall thickness $d_1$ along the waveguide path(s). In contrast to known prior art configurations, the center of the measuring tube 12 with the fluid F flowing therethrough is omitted during the measurement, as a result of which significant measurement errors especially at the transition from turbulent to laminar flows (or vice versa) or in case of an asymmetric flow profile are avoided. As turbulent or unstable flow profiles often occur directly behind branches or the like, a shorter inflow path than in the prior art can be selected for the fluid measuring device 10 according to the invention, while still achieving a high measurement accuracy.

The invention claimed is:

1. A fluid measuring device for determining at least one characteristic property of a fluid, comprising:
   a measuring tube having a fluid duct through which the fluid can flow and which has a measuring section in which the measuring tube is cylindrical on an inside and at least an area of a measuring tube wall is configured as a waveguide for surface acoustic waves which forms an interface to the fluid, and
   at least one transmitter for exciting acoustic waves in the waveguide and at least one receiver for receiving acoustic waves from the waveguide which are arranged in direct contact with an outer surface of the waveguide,
   wherein part of an energy of the acoustic waves excited by the transmitter is coupled into the fluid and propagates at least in sections as a volume wave through the fluid,
   wherein the waveguide has at least two elongated waveguide paths, which are arranged offset by less than 180° along a circumference of the measuring tube, the volume wave propagating in the fluid between the two waveguide paths, wherein a central area of the fluid duct is omitted by the volume wave, wherein at least one of the waveguide paths, with respect to a center line thereof, extends at least in sections at an acute angle to a longitudinal extension direction of the measuring tube and in addition with a component in a circumferential direction, and wherein in the area of the waveguide paths, the measuring tube wall has a smaller wall thickness than in areas of the measuring tube adjoining the waveguide paths.

2. The fluid measuring device according to claim 1, wherein the at least one of the waveguide paths extends substantially along a helical line about the fluid duct and/or has an S-shape.

3. The fluid measuring device according to claim 1, wherein the smaller wall thickness in the area of the waveguide paths is produced by a groove in an exterior side of the measuring tube.

4. The fluid measuring device according to claim 3, wherein the groove is produced by machining.

5. The fluid measuring device according to claim 3, wherein the groove has a substantially U-shaped cross-section.

6. The fluid measuring device according to claim 3, wherein in a top view on the groove, the groove has rounded longitudinal ends.

7. The fluid measuring device according to claim 1, wherein the measuring tube wall has a substantially constant wall thickness along the waveguide paths.

8. The fluid measuring device according to claim 1, wherein the two waveguide paths have a same shape.

9. The fluid measuring device according to claim 1, wherein the two waveguide paths are arranged at a same axial height of the measuring tube.

10. The fluid measuring device according to claim 1, wherein the two waveguide paths circumferentially have a same distance over their length.

11. The fluid measuring device according to claim 1, wherein the two waveguide paths are arranged offset by approximately 120°.

12. The fluid measuring device according to claim 1, wherein a transmitter and a receiver are assigned to each path.

13. The fluid measuring device according to claim 1, wherein as seen in the longitudinal extension direction of the measuring tube, each of the waveguide paths has a first end and a second end, a transmitter being provided at at least one first end and a receiver being provided at at least one second end.

14. The fluid measuring device according to claim 13, wherein at least the ends of waveguide paths at which a transmitter or a receiver is arranged, are flattened and form a planar contact surface for the transmitter or the receiver.

15. A fluid measuring device for determining at least one characteristic property of a fluid, comprising:
  a measuring tube having a fluid duct through which the fluid can flow and which has a measuring section in which the measuring tube is cylindrical on an inside and at least an area of a curved measuring tube wall is configured as a waveguide for surface acoustic waves which forms an interface to the fluid, and
  at least one transmitter for exciting acoustic waves in the waveguide and at least one receiver for receiving acoustic waves from the waveguide which are arranged in direct contact with an outer surface of the waveguide,
  wherein part of an energy of the acoustic waves excited by the transmitter is coupled into the fluid and propagates at least in sections as a volume wave through the fluid,
  wherein the waveguide has a single or a plurality of elongated waveguide paths which, with respect to a center line thereof, extend at least in sections at an acute angle to a longitudinal extension direction of the measuring tube and in addition with a component in a circumferential direction,
  wherein in the area of the single or the plurality of waveguide paths, the measuring tube wall has a smaller wall thickness than in areas of the measuring tube adjoining the waveguide path (s),
  wherein as seen in the longitudinal extension direction of the measuring tube, the single waveguide path has or the plurality of waveguide paths each have a first end and a second end, a transmitter being provided at at least one first end and a receiver being provided at at least one second end, wherein only the ends of the single or plurality of waveguide paths at which a transmitter or a receiver is arranged, are flattened while a remaining portion of the waveguide path is curved, the flattened ends forming a planar contact surface for the transmitter or the receiver.

* * * * *